United States Patent
Chiba et al.

(10) Patent No.: US 11,428,228 B2
(45) Date of Patent: Aug. 30, 2022

(54) SCREW COMPRESSOR HAVING A DIFFERENT PRESSURE OF THE FLUID APPLIED TO THE SEAL RING ON THE DELIVERY SIDE SHAFT SEALING UNIT

(71) Applicant: Hitachi Industrial Equipment Systems Co., Ltd., Tokyo (JP)

(72) Inventors: Kotaro Chiba, Tokyo (JP); Masahiko Takano, Tokyo (JP); Kenji Morita, Tokyo (JP); Yoshitaka Takeuchi, Tokyo (JP); Takeshi Tsuchiya, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 21 days.

(21) Appl. No.: 16/971,575

(22) PCT Filed: Feb. 21, 2018

(86) PCT No.: PCT/JP2018/006146
§ 371 (c)(1),
(2) Date: Aug. 20, 2020

(87) PCT Pub. No.: WO2018/117276
PCT Pub. Date: Jun. 28, 2018

(65) Prior Publication Data
US 2020/0378385 A1   Dec. 3, 2020

(51) Int. Cl.
*F03C 2/00* (2006.01)
*F03C 4/00* (2006.01)
(Continued)

(52) U.S. Cl.
CPC ............ *F04C 27/009* (2013.01); *F04C 18/16* (2013.01); *F04C 27/005* (2013.01); *F04C 29/026* (2013.01); *F04C 29/028* (2013.01)

(58) Field of Classification Search
CPC ...... F04C 18/16; F04C 27/005; F04C 27/009; F04C 29/026; F04C 29/028;
(Continued)

(56) References Cited

U.S. PATENT DOCUMENTS 3,971,563 A * 7/1976 Sugimura ............... F16J 15/16
                                                     277/413
4,487,563 A * 12/1984 Mori ..................... F04C 27/009
                                                     418/104
(Continued)

FOREIGN PATENT DOCUMENTS

JP         1-163492 A     6/1989
JP       2005-214045 A    8/2005
(Continued)

OTHER PUBLICATIONS

International Search Report (PCT/ISA/210) issued in PCT Application No. PCT/JP2018/006146 dated May 22, 2018 with English translation (three pages).
(Continued)

*Primary Examiner* — Theresa Trieu
(74) *Attorney, Agent, or Firm* — Crowell & Moring LLP

(57) ABSTRACT

A screw compressor includes a screw rotor, a casing, and a delivery side shaft sealing unit. The delivery side shaft sealing unit includes an annular groove, a seal ring, and a shaft sealing fluid supply passage. Pressure of the fluid that is supplied to the one side, in the axial direction, of the seal ring via the shaft sealing fluid supply passage is set higher than pressure that acts on a first side surface, in an axial direction with respect to a first side wall surface of the annular groove, of the seal ring.

10 Claims, 10 Drawing Sheets

(51) Int. Cl.
*F04C 2/00* (2006.01)
*F04C 18/00* (2006.01)
*F04C 27/00* (2006.01)
*F04C 18/16* (2006.01)
*F04C 29/02* (2006.01)

(58) Field of Classification Search
CPC ........ F04C 2240/30; F16J 15/16; F16J 15/44; F16J 15/441; F16J 15/445; F16J 15/54; F16J 15/545
See application file for complete search history.

(56) References Cited

U.S. PATENT DOCUMENTS

| | | | |
|---|---|---|---|
| 4,984,974 A | 1/1991 | Naya et al. | |
| 5,281,116 A * | 1/1994 | Gwin | F04C 18/16 418/201.1 |
| 6,095,780 A * | 8/2000 | Ernens | F04C 27/009 418/104 |
| 6,572,354 B2 | 6/2003 | Kammhoff et al. | |
| 2015/0240950 A1* | 8/2015 | Takahashi | F16J 15/3452 277/377 |

FOREIGN PATENT DOCUMENTS

| | | | | |
|---|---|---|---|---|
| JP | 2012-127314 A | | 7/2012 | |
| JP | 2017044123 A | * | 3/2017 | ............ F04C 27/009 |
| WO | WO-2016052297 A1 | * | 4/2016 | ............... F16J 15/16 |
| WO | WO-2016052298 A1 | * | 4/2016 | ............ F04C 27/009 |

OTHER PUBLICATIONS

Japanese-language Written Opinion (PCT/ISA/237) issued in PCT Application No. PCT/JP2018/006146 dated May 22, 2018 (three pages).

* cited by examiner

PRESSURE : $P_{oil} > P_{max} > P_{min}$

PRESSURE : $P_{oil} > P_{max} > P_{min}$

PRESSURE : $P_{oil} > P_{max} > P_{min}$

PRESSURE : $P_{oil2} > P_{oil1}$

SCREW COMPRESSOR HAVING A DIFFERENT PRESSURE OF THE FLUID APPLIED TO THE SEAL RING ON THE DELIVERY SIDE SHAFT SEALING UNIT

TECHNICAL FIELD

The present invention relates to a screw compressor, and particularly to a screw compressor in which its shaft is sealed by using a seal ring.

BACKGROUND ART

In a compressor, a pump, or the like, a working fluid leaks via a clearance between a shaft section of a rotor and a shaft hole of a casing. Efficiency is decreased as an amount of leakage of the working fluid is increased. The clearance therefore needs to be sealed. Means for shaft sealing include a method of using a seal ring as well as a method using a mechanical seal or an oil seal, and the like.

A technology related to shaft sealing by a seal ring in a screw compressor is described in Patent Document 1, for example. In the screw compressor described in Patent Document 1, an annular groove is provided in an intermediate portion of a shaft section on a delivery side of a screw rotor, and a seal ring is disposed in the annular groove. The outer circumferential surface of the seal ring is brought into contact with the inner surface of a shaft hole of a casing, and one end surface (side surface in an axial direction) of the seal ring is brought into contact with one groove wall of the annular groove by the pressure of an outlet region of a compressed working medium. A clearance between the shaft section and the shaft hole is thereby sealed.

PRIOR ART DOCUMENT

Patent Document

Patent Document 1: U.S. Pat. No. 6,572,354

SUMMARY OF THE INVENTION

Problems to be Solved by the Invention

In the screw compressor, a plurality of compression chambers defined by the screw rotor having a plurality of helical lobes and the casing housing the screw rotor are contracted while moved in the axial direction as the screw rotor rotates. The working fluid within the compression chambers is thereby compressed. Because of such a compression principle, the pressure of the working fluid in the vicinity of a delivery side end surface of the screw rotor differs according to the position, in a rotational direction (circumferential direction), of each compression chamber. That is, the working fluid in the vicinity of the delivery side end surface has a pressure distribution in the circumferential direction. The pressure distribution in the circumferential direction of the working fluid causes a pressure distribution in the circumferential direction to occur in the working fluid leaking into the clearance between the shaft section on the delivery side of the screw rotor and the shaft hole on the delivery side of the casing (shaft hole clearance on the delivery side). Therefore, in a region of relatively high pressure, the working fluid leaks to the outside of the compressor, whereas in a region of relatively low pressure, a leakage flow rate of the working fluid is lower than in the high pressure region, or an external fluid flows into the compression chamber instead in some cases.

Thus, in the screw compressor, the working fluid leaking into the shaft hole clearance on the delivery side has a pressure distribution in the circumferential direction. Also in the screw compressor described in the foregoing Patent Document 1, the working fluid leaking into the shaft hole clearance on the delivery side has a pressure distribution in the circumferential direction, and thus pressure acting on the side surface, in the axial direction, of the seal ring differs in the circumferential direction. Therefore, in the region on which the relatively low pressure acts in the side surface of the seal ring, a force may act in an opposite direction from that in the region on which the relatively high pressure acts. There is thus a fear of inclination of the seal ring. When the seal ring is inclined, an area of contact between the side surface, in the axial direction, of the seal ring and the groove wall of the annular groove, and an area of contact between the outer circumferential surface of the seal ring and the inner surface of the shaft hole are decreased significantly, therefore, shaft sealing performance of the seal ring is decreased.

The present invention has been made to solve the above-described problems. It is an object of the present invention to provide a screw compressor that can exert high shaft sealing performance even when there is a pressure distribution in a circumferential direction in a working fluid leaking into a clearance between a shaft section on a delivery side of a screw rotor and a shaft hole on the delivery side of a casing.

Means for Solving the Problem

In order to solve the above-described problems, configurations described in claims, for example, are adopted.

The present application includes a plurality of means for solving the above-described problems. To cite an example of the means, there is provided a screw compressor including: a screw rotor having a screw-shaped rotor section and shaft sections each arranged at respective end portions on both sides, in an axial direction, of the rotor section; a casing having shaft holes through which the shaft sections are inserted, the casing housing the screw rotor; and a delivery side shaft sealing unit configured to seal a clearance between a shaft section on a delivery side and a shaft hole on the delivery side against leakage of a working fluid. The delivery side shaft sealing unit includes: an annular groove provided in an outer circumferential portion in the shaft section on the delivery side, the outer circumferential portion being opposed to the shaft hole on the delivery side; a seal ring disposed movably in an axial direction of the shaft section on the delivery side within the annular groove, the seal ring being capable of sliding contact with an inner wall surface of the shaft hole on the delivery side and a side wall surface of the annular groove; and a shaft sealing fluid supply passage provided in the casing so as to make an outside of the casing and the shaft hole on the delivery side communicate with each other, the shaft sealing fluid supply passage being configured to supply a fluid to one side, in an axial direction, of the seal ring. Pressure of the fluid that is supplied to the one side, in the axial direction, of the seal ring via the shaft sealing fluid supply passage is set higher than pressure that acts on another side, in the axial direction, of the seal ring.

Advantages of the Invention

According to the present invention, the fluid at the pressure higher than the pressure acting on one side, in the axial direction, of the seal ring is supplied to the other side in the axial direction of the seal ring via the shaft sealing fluid supply passage. Thus, even when the working fluid leaking into the clearance between the shaft section on the delivery side and the shaft hole on the delivery side has a pressure distribution in a circumferential direction, the seal ring is uniformly pressed against the inner wall surface of the shaft hole on the delivery side and the side wall surface of the annular groove, and is not inclined. Hence, the clearance can be sealed securely, thus high shaft sealing performance can be exerted.

Problems, configurations, and effects other than those described above will be clarified by the following description of embodiments.

MODES FOR CARRYING OUT THE INVENTION

Screw compressors according to embodiments of the present invention will hereinafter be illustratively described with reference to the drawings. The present embodiments are examples in which the present invention is applied to a twin rotor type screw compressor of an oil-supplied type for compressing air.

First Embodiment

Figure 1:
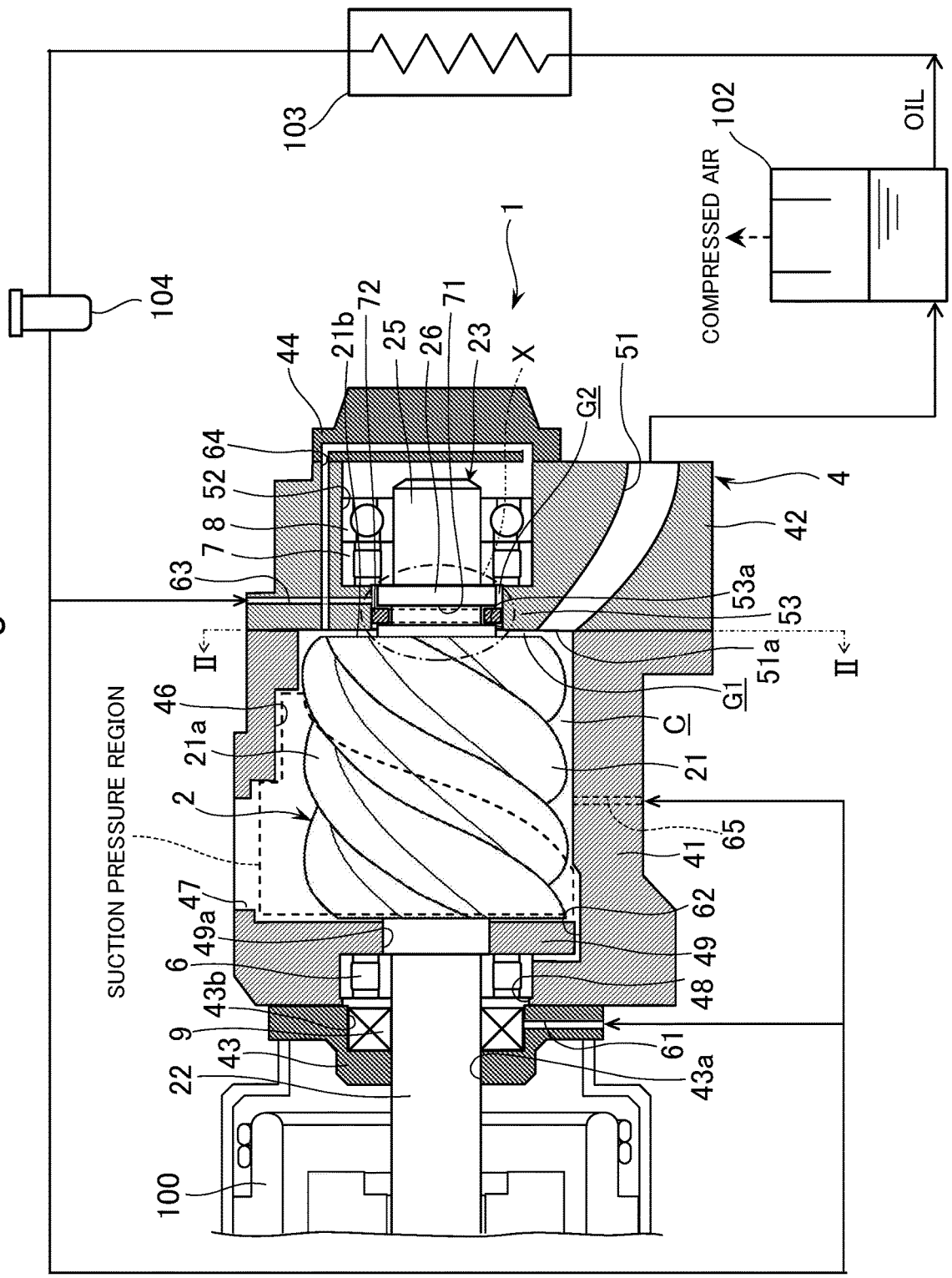
FIG. 1 is a longitudinal sectional view showing a screw compressor according to a first embodiment of the present invention and a system diagram showing the supply of a lubricating oil to the screw compressor according to the first embodiment of the present invention.
Figure 2:
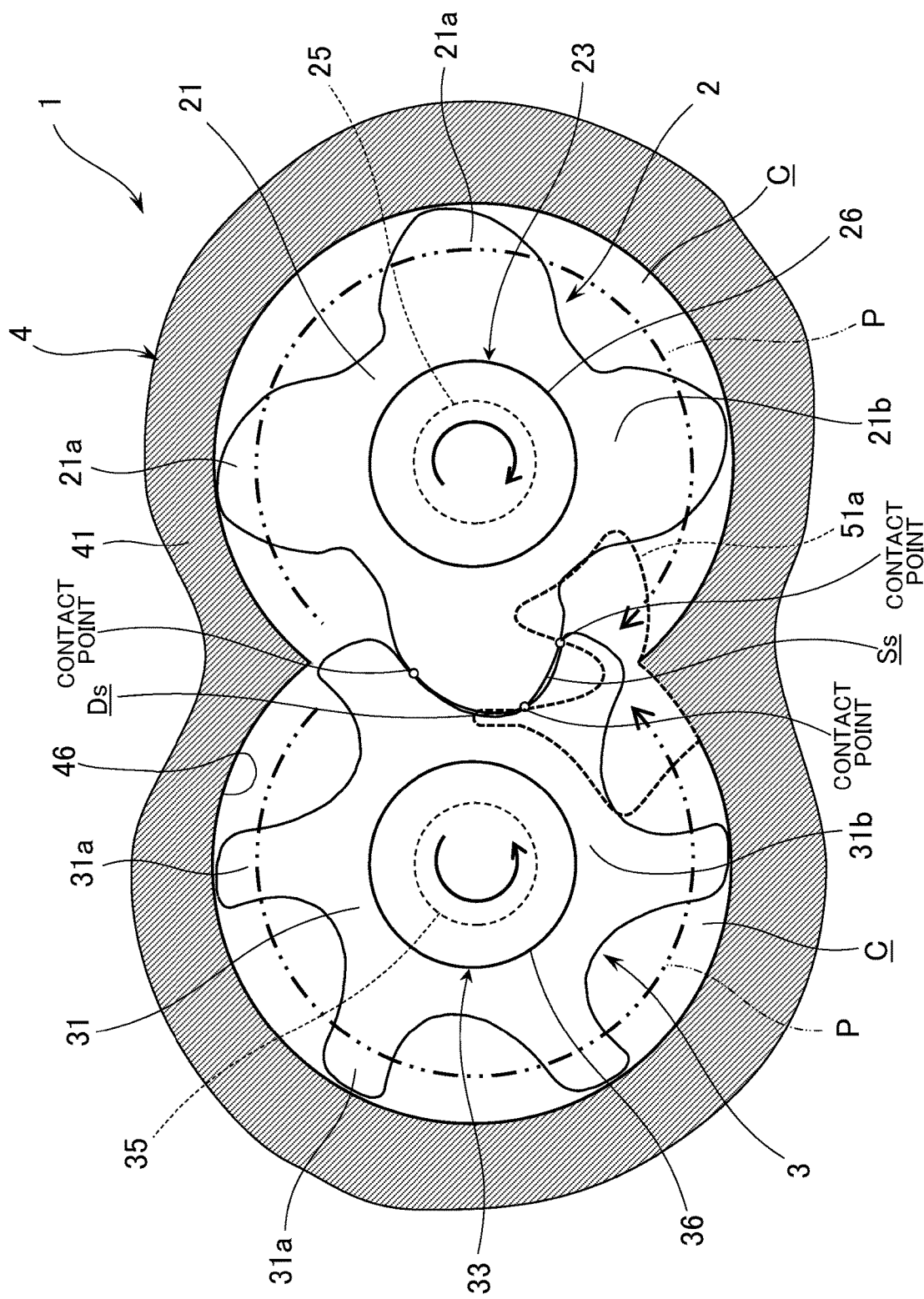
FIG. 2 is a transverse sectional view of the screw compressor according to the first embodiment of the present invention shown in FIG. 1 as viewed from the direction of arrows II-II.

A configuration of a screw compressor according to a first embodiment will be described with reference to FIG. 1 and FIG. 2. FIG. 1 is a longitudinal sectional view of the screw compressor according to the first embodiment and a system diagram showing the supply of a lubricating oil to the screw compressor. FIG. 2 is a transverse sectional view of the screw compressor shown in FIG. 1 as viewed from in the direction of arrows II-II. In FIG. 1, a left side is a suction side of the screw compressor, and a right side is a delivery side of the screw compressor. In FIG. 2, thick line arrows indicate directions of rotation of the screw compressor.

In FIG. 1 and FIG. 2, the screw compressor 1 includes: a male rotor (male type screw rotor) 2 and a female rotor (female type screw rotor) 3 that rotate in mesh with each other; and a casing 4 that houses both of the male and female rotors 2 and 3. The male rotor 2 is rotatably supported by a suction side bearing 6 and delivery side bearings 7 and 8, and is connected to a motor 100 as a rotation driving source. As with the male rotor 2, the female rotor 3 is rotatably supported by a suction side bearing (not shown) and delivery side bearings (not shown).

The male rotor 2 includes: a screw-shaped rotor section 21 having a plurality of helical lobes 21a (four helical lobes in FIG. 2); and a shaft section 22 on the suction side (left side in FIG. 1) and a shaft section 23 on the delivery side (right side in FIG. 1) that are each arranged at respective end portions on both sides, in an axial direction (a left-right direction in FIG. 1 and a direction perpendicular to the paper plane of FIG. 2), of the rotor section 21. The rotor section 21 has, on the delivery side in the axial direction thereof, a delivery side end surface 21b opposed to an inner wall surface of the casing 4 with a predetermined clearance (hereinafter referred to as a delivery end surface clearance) G1 therebetween. The shaft section 22 on the suction side extends to the outside of the casing 4. The shaft section 22 on the suction side is for example of a configuration integral with a shaft section of the motor 100. A mechanical seal 9 is attached to a part of the shaft section 22 on the suction side which part is on a distal end side of the shaft section 22 with respect to the suction side bearing 6. The shaft section 23 on the delivery side is a stepped shaft portion. The shaft section 23 on the delivery side includes: a small diameter shaft portion 25 to which the delivery side bearings 7 and 8 are attached; and a large diameter shaft portion 26 located between the small diameter shaft portion 25 and the rotor section 21 and having a larger diameter than the small diameter shaft portion 25.

The female rotor 3 includes: a screw-shaped rotor section 31 having a plurality of helical lobes 31a (six helical lobes in FIG. 2); and a shaft section on the suction side (not shown) and a shaft section 33 on the delivery side that are each arranged at respective end portions on both sides, in the axial direction (direction perpendicular to the paper plane of FIG. 2), of the rotor section 31. As with the rotor section 21 of the male rotor 2, the rotor section 31 has, on the delivery side in the axial direction, a delivery side end surface 31b opposed to the inner wall surface of the casing 4 with a delivery end surface clearance therebetween. As with the shaft section 23 on the delivery side of the male rotor 2, the shaft section 33 on the delivery side is a stepped shaft portion. The shaft section 33 on the delivery side includes: a small diameter shaft portion 35 to which delivery side bearings (not shown) are attached; and a large diameter shaft portion 36 located between the small diameter shaft portion 35 and the rotor section 31 and having a larger diameter than the small diameter shaft portion 35.

The casing 4 includes a main casing 41 and a delivery side casing 42 attached to the delivery side (right side in FIG. 1) of the main casing 41.

Two substantially cylindrical spaces partly overlapping each other, which spaces are referred to as a bore 46, are arranged in the main casing 41. One side, in the axial direction (right side in FIG. 1), of the bore 46 opens. The bore 46 houses the rotor sections 21 and 31 of the male rotor 2 and the female rotor 3. A suction port 47 is provided in an outer peripheral portion of the main casing 41. The suction port 47 makes a region on an opposite side from an opening side in the bore 46 and the outside of the main casing 41 communicate with each other. A suction side end portion in the axial direction of the main casing 41 is provided with each of suction side bearing chambers (suction side bearing chamber on the female rotor 3 side is not shown) 48 that retain the suction side bearings 6 for the male rotor 2 and the female rotor 3. One sides (left side in FIG. 1) of the suction side bearing chambers 48 open. The bore 46 is partitioned from the suction side bearing chambers 48 by a suction side partition wall 49. The suction side partition wall 49 is provided with suction side shaft holes (suction side shaft hole on the female rotor 3 side is not shown) 49a through which the shaft sections 22 on the suction side of the male rotor 2 and the female rotor 3 are inserted. The shaft sections 22 on the suction side of the male rotor 2 and the female rotor 3 are each arranged with a predetermined clearance in the suction side shaft holes 49a.

A suction side cover 43 is attached to the main casing 41. The suction side cover 43 closes the openings of both the suction side bearing chambers 48 of the male rotor 2 and the female rotor 3. The suction side cover 43 is provided with a cover shaft hole 43a through which the shaft section 22 on the suction side of the male rotor 2 is inserted. The suction side cover 43 has, on the cover shaft hole 43a side, a seal chamber 43b in which the mechanical seal 9 is disposed.

The delivery side casing 42 closes the opening of the bore 46 of the main casing 41. The delivery side casing 42 is provided with a delivery flow passage 51 that makes the outside of the delivery side casing 42 and the bore 46 communicate with each other. The delivery flow passage 51 has a delivery port 51a in a predetermined shape in an end surface on the bore 46 side of the delivery side casing 42. A part of the delivery side casing 42 which part is on an opposite side from the bore 46 side is provided with each of delivery side bearing chambers (delivery side bearing chamber on the female rotor 3 side is not shown) 52 that retain the delivery side bearings 7 and 8 for the male rotor 2 and the female rotor 3. One sides (right side in FIG. 1) of the delivery side bearing chambers 52 open. The bore 46 is partitioned from the delivery side bearing chambers 52 by a delivery side partition wall 53. The delivery side partition wall 53 is provided with delivery side shaft holes (delivery side shaft hole on the female rotor 3 side is not shown) 53a through which the shaft sections 23 and 33 on the delivery side of the male rotor 2 and the female rotor 3 are inserted. The large diameter shaft portions 26 and 36 of the shaft sections 23 and 33 on the delivery side of the male rotor 2 and the female rotor 3 are each arranged with a predetermined clearance (hereinafter referred to as a delivery side shaft hole clearance) G2 in the delivery side shaft holes 53a. A delivery side cover 44 is attached to the delivery side casing 42. The delivery side cover 44 closes the openings of both the delivery side bearing chambers 52 of the male rotor 2 and the female rotor 3

The suction side cover 43 is provided with a suction side bearing oil feeding passage 61 that makes the outside of the suction side cover 43 communicate with the seal chamber 43b and the suction side bearing chamber 48. The suction side bearing oil feeding passage 61 allows supply of the lubricating oil from the outside of the screw compressor 1 to the suction side bearing 6 and the mechanical seal 9. The main casing 41 is provided with a suction side oil recovery passage 62 that makes the suction side bearing chambers 48 and a region at suction pressure within the bore 46 communicate with each other. The suction side oil recovery passage 62 recovers the lubricating oil having lubricated the suction side bearing 6 and the mechanical seal 9 by guiding the lubricating oil into the bore 46.

The delivery side casing 42 is provided with a delivery side bearing oil feeding passage 63 that makes the outside of the delivery side casing 42 and the delivery side shaft holes 53a communicate with each other. The delivery side bearing oil feeding passage 63 allows supply of the lubricating oil from the outside of the screw compressor 1 to the delivery side bearings 7 and 8. The delivery side casing 42 and the delivery side cover 44 are provided with a delivery side oil recovery passage 64 that makes the delivery side bearing chambers 52 of the delivery side casing 42 and the region at suction pressure within the bore 46 of the main casing 41 communicate with each other. The delivery side oil recovery passage 64 recovers the lubricating oil having lubricated the delivery side bearings 7 and 8 by guiding the lubricating oil into the bore 46.

The main casing 41 is provided with a compression chamber oil feeding passage 65 that makes the outside of the main casing 41 and the bore 46 communicate with each other. The compression chamber oil feeding passage 65 is configured to supply the lubricating oil to both of the male and female rotors 2 and 3 within the bore 46.

The suction side bearing oil feeding passage 61, the delivery side bearing oil feeding passage 63, and the compression chamber oil feeding passage 65 are connected to an oil separator 102. These oil feeding passages 61, 63, and 65 are supplied with the lubricating oil from the oil separator 102 as a lubricating oil supply source.

In the screw compressor 1 configured as described above, a plurality of compression chambers C are defined by the plurality of lobes 21a and 31a (rotor sections 21 and 31) of the male rotor 2 and the female rotor 3 and the inner wall surface of the casing 4 surrounding the rotor sections 21 and (specifically, an inner wall surface of the bore 46 of the main casing 41 and an end surface on the bore 46 side of the delivery side casing 42). When the male rotor 2 is driven by the motor 100 and thereby rotation-drives the female rotor 3, the volume of the compression chambers C is decreased while the compression chambers C are moved in the axial direction as the rotation of both the male and female rotors 2 and 3 progresses. Thus, an air as a working fluid sucked into the compression chambers C via the suction port 47 is compressed until the air reaches a predetermined pressure. The air is then delivered to the oil separator 102 via the delivery flow passage 51. The oil separator 102 separates the lubricating oil contained in the compressed air from the compressed air. The compressed air from which the lubricating oil is removed is supplied to an external compressed air consuming apparatus (not shown). The separated lubricating oil is stored in the oil separator 102.

The lubricating oil stored in the oil separator 102 is cooled by an oil cooler 103. After impurities in the lubricating oil are removed by an oil filter 104, the lubricating oil is supplied to the screw compressor 1. The supply of the lubricating oil to the screw compressor 1 can be performed by the pressure of the compressed air flowing into the oil separator 102 without the use of a power source such as a pump.

The lubricating oil supplied to the screw compressor 1 is supplied to the mechanical seal 9 and the suction side bearing 6 via the suction side bearing oil feeding passage 61, lubricates the mechanical seal 9 and the suction side bearing 6, and is then recovered into regions of a suction process in the compression chambers C via the suction side oil recovery passage 62. As with the suction side bearing 6, the delivery side bearings 7 and 8 are also supplied with the lubricating oil via the delivery side bearing oil feeding passage 63 and the delivery side shaft hole 53*a*. The lubricating oil having lubricated the delivery side bearings 7 and 8 is recovered into regions of the suction process in the compression chambers C via the delivery side oil recovery passage 64. In addition, the lubricating oil in the oil separator 102 is supplied into the compression chambers C via the compression chamber oil feeding passage 65, thus an air in regions of a compression process is cooled and a clearance between adjacent compression chambers C is sealed. The lubricating oil recovered in the compression chambers C is delivered from the delivery flow passage 51 together with the compressed air, and flows into the oil separator 102.

A clearance of at least a few ten to a few hundred µm is provided between external surfaces of both the male and female rotors 2 and 3 and the inner wall surface of the casing 4 in order to prevent damage caused by contact. For example, as described above, the delivery end surface clearance G1 is provided between the delivery side end surfaces 21*b* and 31*b* of the rotor sections 21 and 31 of both the male and female rotors 2 and 3 and the end surface on the bore 46 side of the delivery side casing 42. In addition, the delivery side shaft hole clearances G2 are provided between the large diameter shaft portions 26 and 36 of the shaft sections 23 and 33 on the delivery side of both the male and female rotors 2 and 3 and the delivery side shaft holes 53*a* of the delivery side casing 42. Therefore, the compressed working fluid within the compression chambers C tries to flow out to the delivery side bearing chambers 52 via the delivery end surface clearance G1 and the delivery side shaft hole clearances G2 due to a pressure difference. Accordingly, the screw compressor 1 according to the present embodiment further includes a delivery side shaft sealing unit that provides sealing against a leakage of the working fluid from the delivery side shaft hole clearance G2.

Figure 3:
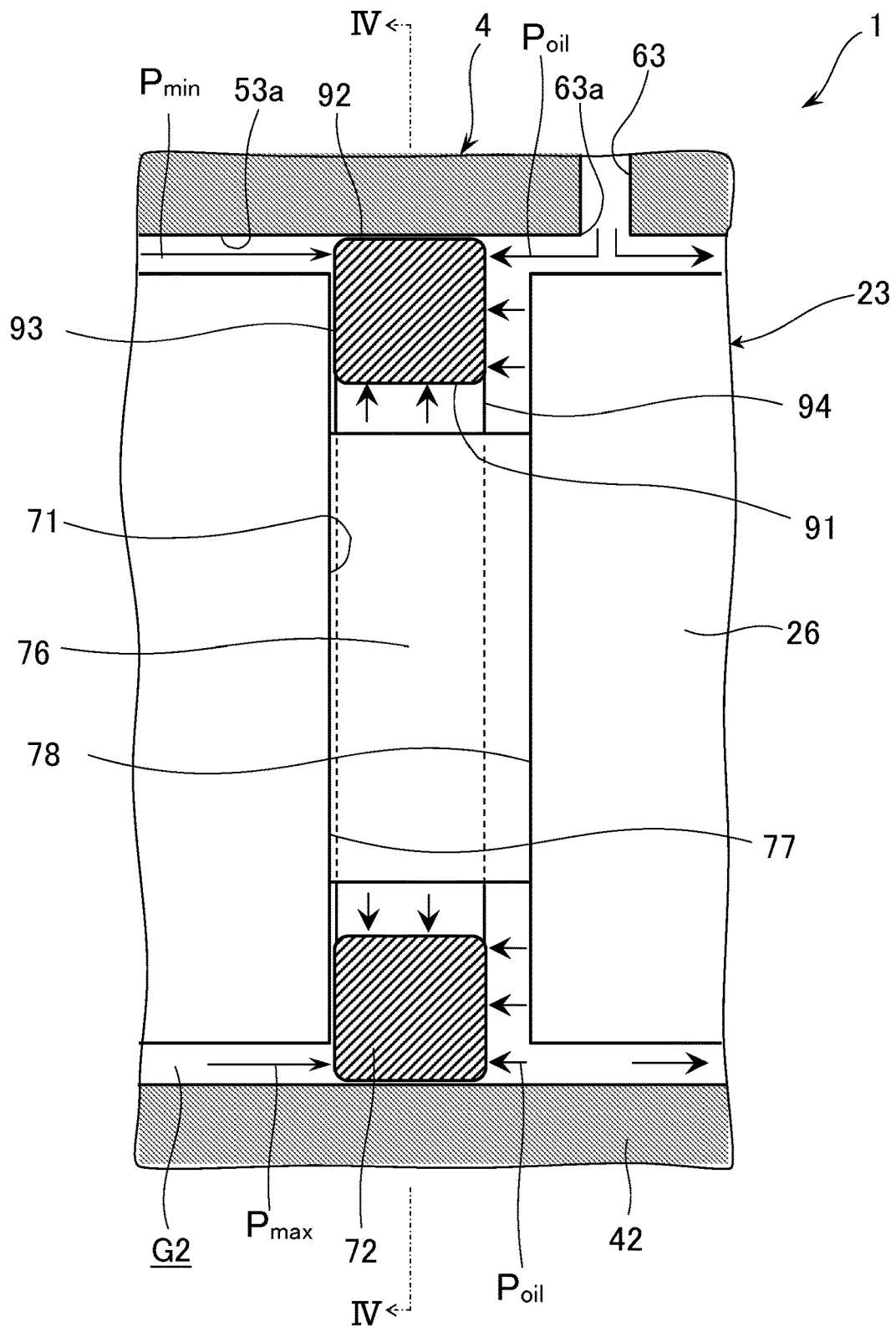
FIG. 3 is an enlarged longitudinal sectional view of a part of the screw compressor according to the first embodiment of the present invention, the part being indicated by a symbol X in FIG. 1.
Figure 4:
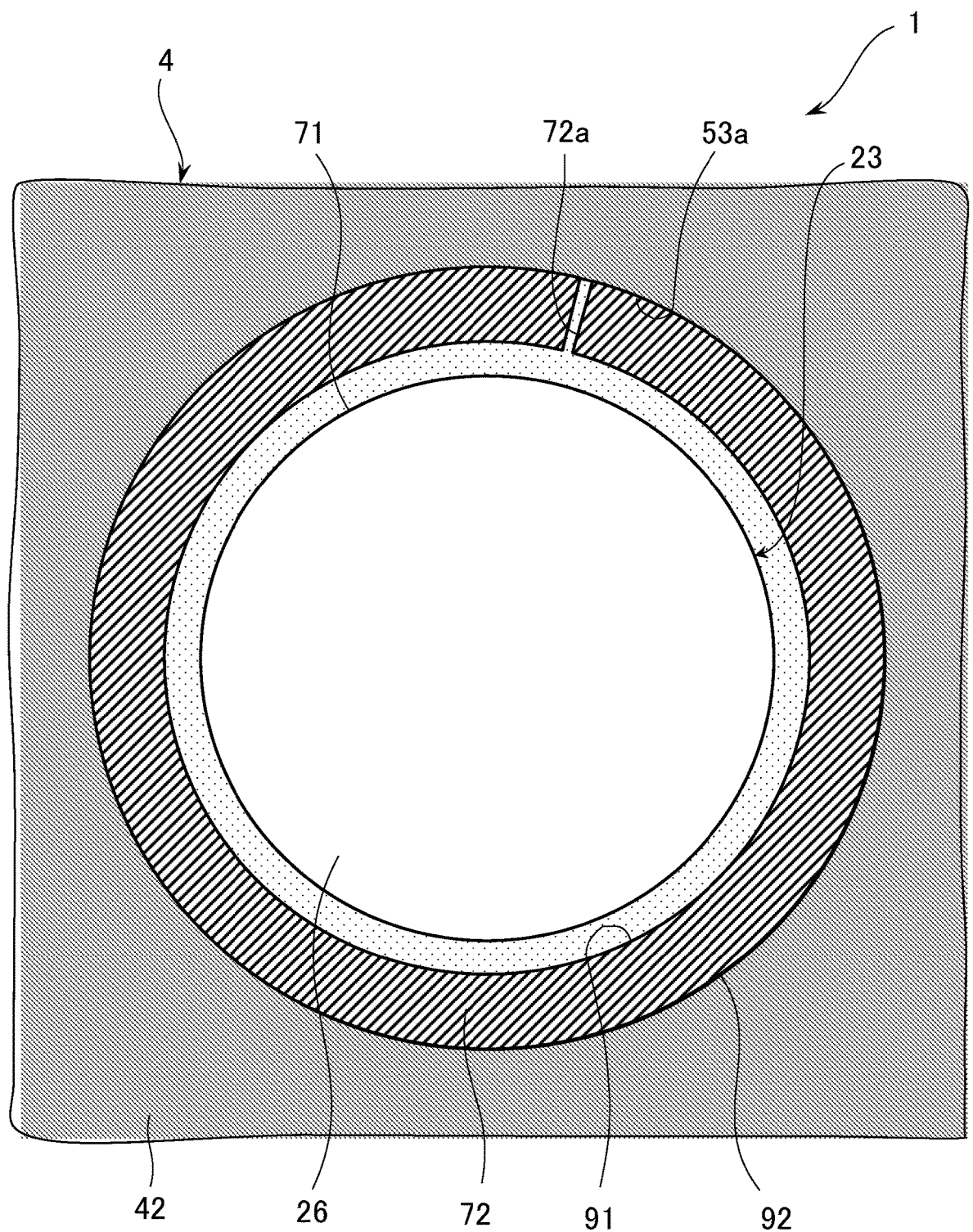
FIG. 4 is a sectional view of the part of the screw compressor according to the first embodiment of the present invention shown in FIG. 3 as viewed from the direction of arrows IV-IV.

Next, a configuration of the delivery side shaft sealing unit of the screw compressor according to the first embodiment will be described with reference to FIG. 1, FIG. 3, and FIG. 4. In the following, only the configuration of the delivery side shaft sealing unit on the male rotor side will be described. However, the delivery side shaft sealing unit on the female rotor side also has a similar configuration. FIG. 3 is an enlarged longitudinal sectional view of a part of the delivery side shaft sealing unit of the screw compressor which part is indicated by a symbol X in FIG. 1. FIG. 4 is a sectional view of a part of the delivery side shaft sealing unit of the screw compressor shown in FIG. 3 as viewed from the direction of arrows IV-IV. In FIG. 3, a left side is the suction side of the screw compressor, and a right side is the delivery side of the screw compressor. Incidentally, in FIG. 3 and FIG. 4, the same reference characters as the reference characters shown in FIG. 1 and FIG. 2 indicate the same parts, and therefore detailed description thereof will be omitted.

In FIG. 1 and FIG. 3, the delivery side shaft sealing unit includes: an annular groove 71 provided in an outer circumferential portion in the large diameter shaft portion 26 of the shaft section 23 on the delivery side which outer circumferential portion is opposed to an inner wall surface of the delivery side shaft hole 53*a*; a seal ring 72 disposed within the annular groove 71; and a shaft sealing fluid supply passage that is provided in the delivery side casing 42 so as to make the outside of the delivery side casing 42 and the delivery side shaft hole 53*a* communicate with each other, and is configured to supply a fluid to one side, in the axial direction (the left side or the right side in FIG. 1 and FIG. 3), of the seal ring 72. In the present embodiment, the delivery side bearing oil feeding passage 63 is used as the shaft sealing fluid supply passage. That is, the delivery side bearing oil feeding passage 63 has a function of supplying the lubricating oil (fluid) from the outside of the screw compressor 1 to the seal ring 72 in addition to a function of supplying the lubricating oil from the outside of the screw compressor 1 to the delivery side bearings 7 and 8.

As shown in FIG. 3, the annular groove 71 is defined by a bottom surface 76 extending in a circumferential direction of the large diameter shaft portion 26 of the shaft section 23 on the delivery side, and a first side wall surface 77 on a shaft section proximal end side (left side in FIG. 3) and a second side wall surface 78 on a shaft section distal end side (right side in FIG. 3) which side wall surfaces rise in a radial direction from the bottom surface 76. The annular groove 71, for example, has an annular shape whose sectional shape is rectangular.

As shown in FIG. 3 and FIG. 4, the seal ring 72 is in an annular shape, and has an abutment 72*a* obtained by dividing one part in the circumferential direction, for example. The seal ring 72 is configured to be easily fitted to the annular groove 71 by widening the abutment 72*a*. The seal ring 72 is, for example, molded of a resin material. The seal ring 72 is thus configured to be expanded by the heat of the lubricating oil (fluid) supplied thereto via the delivery side bearing oil feeding passage 63, and form an annular shape without a gap in the circumferential direction when the abutment 72*a* abuts. The seal ring 72 has an axial width set so as to be smaller than the groove width of the annular groove 71, and is configured to be movable in the axial direction of the shaft section 23 on the delivery side within the annular groove 71. When one side, in the axial direction, of the seal ring 72 and an inner circumferential portion of the seal ring 72 receive the pressure of the lubricating oil (fluid), the other side, in the axial direction, of the seal ring 72 comes into sliding contact with one side wall surface 77 or 78 of the annular groove 71, and an outer circumferential portion of the seal ring 72 comes into sliding contact with the inner wall surface of the delivery side shaft hole 53*a*. The seal ring 72 thereby seals the delivery side shaft hole clearance G2. The seal ring 72 is, for example, formed so as to have a rectangular sectional shape, and has external surfaces formed by an inner circumferential surface 91, an outer circumferential surface 92, a first side surface 93 on the proximal end side (left side in FIG. 3) of the shaft section 23 on the delivery side in the axial direction, and a second side surface 94 on the distal end side (right side in FIG. 3) of the shaft section 23 on the delivery side in the axial direction.

An opening portion 63*a* on the delivery side shaft hole 53*a* side of the delivery side bearing oil feeding passage 63 as the shaft sealing fluid supply passage is located on the distal end side (right side in FIG. 3) of the shaft section 23 on the delivery side with respect to the seal ring 72. The delivery side bearing oil feeding passage 63 is configured to supply a fluid to the distal end side of the shaft section 23 in the axial direction (second side surface 94 side) in the seal ring 72. In the present embodiment, the lubricating oil supplied to the delivery side bearings 7 and 8 is used as the fluid supplied to the shaft sealing fluid supply passage. The delivery side bearing oil feeding passage 63 is fed with the lubricating oil (fluid) from the oil separator 102. That is, the oil separator 102 functions as a lubricating oil supply source for the delivery side bearings 7 and 8, and functions as a shaft sealing fluid supply source for the seal ring 72. The pressure of the lubricating oil (fluid) supplied to the second side surface 94 side of the seal ring 72 via the delivery side bearing oil feeding passage 63 is set higher than a pressure acting on the proximal end side of the shaft section 23 in the axial direction (first side surface 93 side) in the seal ring 72, that is, the pressure of an air (working fluid) flowing into the delivery side shaft hole clearance G2.

Figure 5:
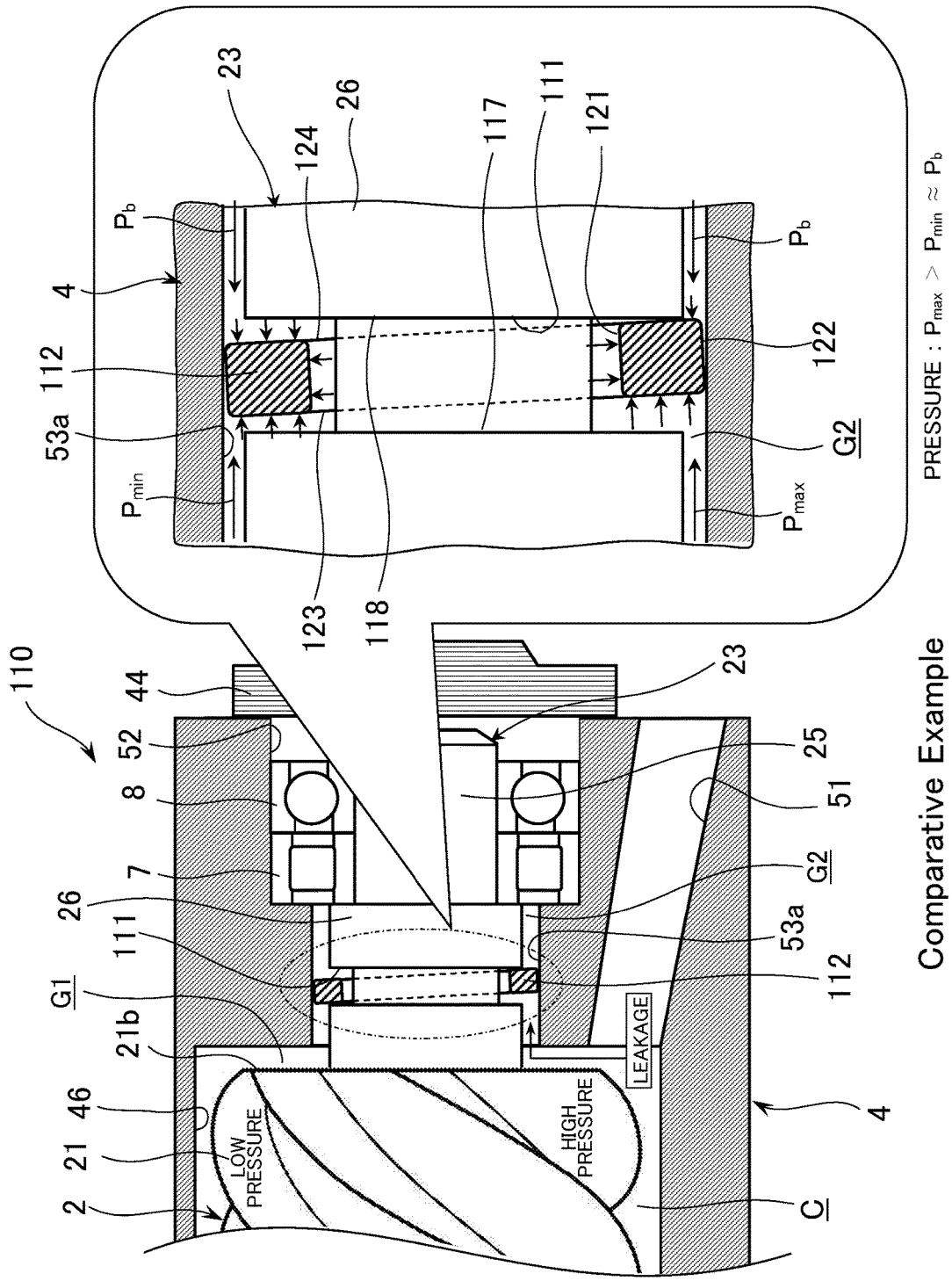
FIG. 5 is a diagram for explaining a delivery side shaft sealing unit of a conventional screw compressor as a comparative example for the screw compressor according to the first embodiment of the present invention.

The action of the delivery side shaft sealing unit of the screw compressor according to the first embodiment will next be described with reference to FIG. 2, FIG. 3, and FIG. 5 in comparison with a shaft sealing unit of a conventional screw compressor. FIG. 5 is a diagram for explaining the shaft sealing unit of the conventional screw compressor as a comparative example for the first embodiment. Incidentally, in FIG. 5, the same reference characters as the reference characters shown in FIGS. 1 to 4 indicate similar parts, and therefore detailed description thereof will be omitted.

In the screw compressor 1 configured as described above, the plurality of compression chambers C are contracted while moved in the axial direction as the male rotor 2 and the female rotor 3 rotate. The plurality of compression chambers C thereby compress the air (working fluid) within the compression chambers C. Because of such a compression principle, the pressure of the compressed air (working fluid) in the vicinity of the delivery side end surfaces 21b and 31b of the rotor sections 21 and 31 of the male rotor 2 and the female rotor 3 differs according to the position, in a rotational direction (circumferential direction), of each compression chamber C. That is, the compressed air in the vicinity of the delivery side end surfaces 21b and 31b of the rotor sections 21 and 31 has a pressure distribution in the circumferential direction.

To cite a concrete example, as shown in FIG. 2, for example, in a region in which the male rotor 2 and the female rotor 3 do not mesh with each other in the vicinity of the delivery side end surfaces 21b and 31b, the pressure becomes higher in the direction of chain double-dashed line arrows P with a region on an opposite side from the delivery port 51a (upper side in FIG. 2) as a starting point. In addition, in a region in which the male rotor 2 and the female rotor 3 mesh with each other in the vicinity of the delivery side end surfaces 21b and 31b, when the male rotor 2 and the female rotor 3 are in contact with each other at three theoretical points, a high pressure delivery space Ds on an upper side and a low pressure suction space Ss on a lower side are mixed with each other. However, the meshing state (contact state) of the male rotor 2 and the female rotor 3 in the vicinity of the delivery side end surfaces 21b and 31b changes according to the rotational position of the male rotor 2 and the female rotor 3, and therefore the pressure distribution in the region in which the male rotor 2 and the female rotor 3 mesh with each other also differs from the above-described case according to the rotational position of the male rotor 2 and the female rotor 3.

Thus, the compressed air in the vicinity of the delivery side end surfaces 21b and 31b of the rotor sections 21 and 31 has a pressure distribution in the circumferential direction. The pressure distribution of the air in the circumferential direction, therefore, causes a pressure distribution in the circumferential direction also in the compressed air leaking from the plurality of compression chambers C into the delivery side shaft hole clearance G2.

In the shaft sealing unit of the conventional screw compressor 110, as shown in FIG. 5, an annular groove 111 is provided in the shaft section 23 on the delivery side, and a seal ring 112 is disposed within the annular groove 111. The conventional shaft sealing unit causes the pressure of the compressed air leaking from the compression chambers C into the delivery side shaft hole clearance G2 to act on an inner circumferential surface 121 of the seal ring 112 and a first side surface 123 on the rotor section 21 side (left side surface in FIG. 5) of the seal ring 112. The conventional shaft sealing unit is thus intended to seal the delivery side shaft hole clearance G2 by pressing an outer circumferential surface 122 of the seal ring 112 against the delivery side shaft hole 53a, and pressing a second side surface 124 on the delivery side bearing chamber 52 side (right side surface in FIG. 5) of the seal ring 112 against a side wall surface 118 on the delivery side bearing chamber 52 side (right side wall surface in FIG. 5) of the annular groove 111, the side wall surface 118 being one of both side wall surfaces 117 and 118 of the annular groove 111.

However, because the compressed air leaking into the delivery side shaft hole clearance G2 has a pressure distribution in the circumferential direction, the pressure of the compressed air acting on the first side surface 123 of the seal ring 112 is not uniform in the circumferential direction, but has a distribution from a minimum pressure ($P_{min}$) to a maximum pressure ($P_{max}$). For example, as shown in FIG. 5, the maximum pressure ($P_{max}$) acts on a lower region of the first side surface 123 of the seal ring 112, and the minimum pressure ($P_{min}$) acts on an upper region of the first side surface 123 which region is on an opposite side from the lower region. On the other hand, substantially the same pressure ($P_b$) as in the delivery side bearing chamber 52 acts on the second side surface 124 of the seal ring 112 uniformly in the circumferential direction. The minimum pressure ($P_{min}$) of the leaking compressed air may be lower than the pressure ($P_b$) of the delivery side bearing chamber 52, depending on operating conditions of the screw compressor 110.

In such a case, a part of the first side surface 123 of the seal ring 112 on which part a pressure in the vicinity of the maximum pressure ($P_{max}$) acts receives a force toward the delivery side bearing chamber 52 side (right side in FIG. 5). On the other hand, a part on which a pressure in the vicinity of the minimum pressure ($P_{min}$) acts receives a force toward the rotor section 21 side (left side in FIG. 5). There is thus a fear of an inclination of the seal ring 112 within the annular groove 111 and significant decreases in an area of contact between the second side surface 124 of the seal ring 112 and the side wall surface 118 of the annular groove 111 and an area of contact between the outer circumferential surface 122 of the seal ring 112 and the delivery side shaft hole 53a. In this case, the shaft sealing performance of the seal ring 112 is degraded significantly.

On the other hand, in the present embodiment, as shown in FIG. 3, the lubricating oil at a pressure ($P_{oil}$) higher than the maximum pressure ($P_{max}$) of the compressed air leaking into the delivery side shaft hole clearance G2 is supplied to the delivery side shaft hole 53a (delivery side shaft hole clearance G2) via the delivery side bearing oil feeding passage (shaft sealing fluid supply passage) 63. Thus, the inner circumferential surface 91 of the seal ring 72 and an entire area, in the circumferential direction, of the second side surface 94 (right side surface in FIG. 3) on a side closer to the delivery side bearing oil feeding passage 63 receive the pressure ($P_{oil}$) of the lubricating oil at the relatively high pressure. Hence, the seal ring 72 receives a force in the proximal end direction of the shaft section 23 (left direction in FIG. 3) against the pressure of the compressed air, and thus the first side surface 93 (left side surface in FIG. 3) of the seal ring 72 is pressed against the first side wall surface 77 of the annular groove 71, and the outer circumferential surface 92 of the seal ring 72 is pressed against the inner wall surface of the delivery side shaft hole 53a. In addition, the seal ring 72 is heated by the lubricating oil, and is thereby thermally expanded. Thus, the abutment 72a (see FIG. 4) of the seal ring 72 comes into contact at a predetermined set temperature (for example 70° C.)

Because the pressure ($P_{oil}$) higher than the maximum pressure ($P_{max}$) of the compressed air thus acts on the entire area, in the circumferential direction, of the second side surface 94 of the seal ring 72 at all times, the seal ring 72 can be prevented from inclining within the annular groove 71. Therefore, the first side surface 93 of the seal ring 72 and the first side wall surface 77 of the annular groove 71 are surely in sliding contact with each other, and the outer circumferential surface 92 of the seal ring 72 and the delivery side shaft hole 53a are surely in sliding contact with each other. In addition, the gap of the abutment 72a of the seal ring 72 disappears due to thermal expansion. Hence, the leakage of the compressed air in the delivery side shaft hole clearance G2 is interrupted. The compressed air leaking from the compression chambers C into the delivery side bearing chamber 52 (see FIG. 1) is therefore decreased significantly, which makes it possible to save energy of the screw compressor 1.

Incidentally, the lubricating oil supplied to the delivery side shaft hole clearance G2 via the delivery side bearing oil feeding passage 63 applies a pressure to the second side surface 94 of the seal ring 72, and then lubricates the delivery side bearings 7 and 8. Thereafter, the lubricating oil flows into the compression chambers C in the suction process via the delivery side oil recovery passage 64, and is delivered from the delivery flow passage 51 to the outside together with the compressed air.

As described above, according to the first embodiment, the fluid at the pressure ($P_{oil}$) higher than the pressure ($P_{max}$) of the compressed air (working fluid) acting on the first side surface 93 (one side in the axial direction) of the seal ring 72 is supplied to the second side surface 94 side (other side in the axial direction) of the seal ring 72 via the delivery side bearing oil feeding passage (shaft sealing fluid supply passage) 63. Thus, even when the compressed air (working fluid) leaking into the delivery side shaft hole clearance G2 has a pressure distribution in the circumferential direction, the seal ring 72 is uniformly pressed against the inner wall surface of the delivery side shaft hole 53a and the side wall surface 77 of the annular groove 71, and is not inclined. Hence, the delivery side shaft hole clearance G2 can be sealed surely, so that high shaft sealing performance can be exerted.

In addition, according to the present embodiment, the shaft sealing fluid supply passage also performs the function of the delivery side bearing oil feeding passage 63 that supplies the lubricating oil to the delivery side bearings 7 and 8. Thus, structural simplification can be achieved as compared with a configuration in which the shaft sealing fluid supply passage and the delivery side bearing oil feeding passage 63 are provided individually.

Incidentally, while the above description has illustrated the actions and effects of the delivery side shaft sealing unit of the male rotor 2, the actions and effects of the delivery side shaft sealing unit of the female rotor 3 are also similar.

First Modification of First Embodiment

Figure 6:
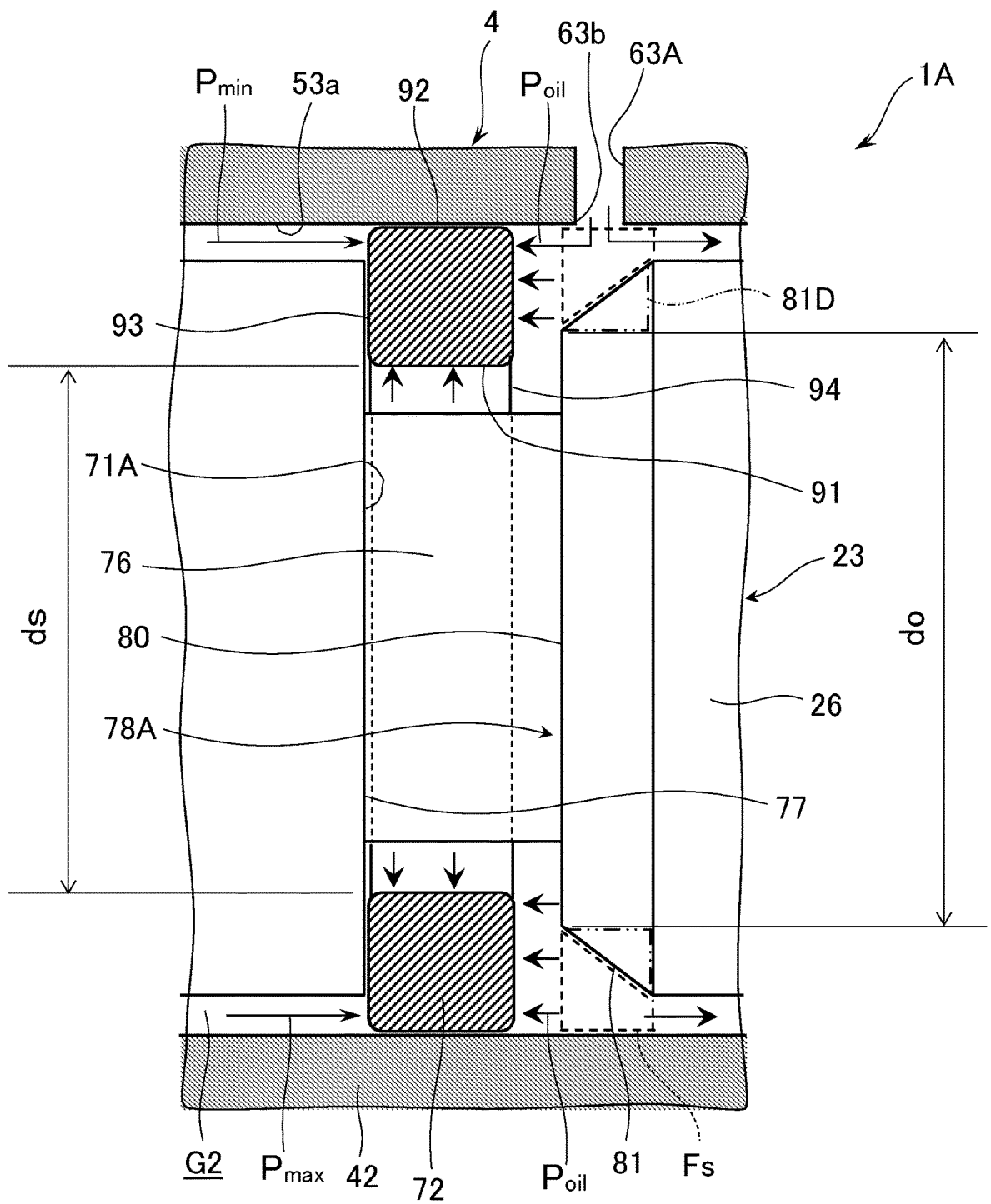
FIG. 6 is an enlarged longitudinal sectional view of a part of a screw compressor according to a first modification of the first embodiment of the present invention.

A screw compressor according to a first modification of the first embodiment to which the present invention is applied will next be illustratively described with reference to FIG. 6. FIG. 6 is an enlarged longitudinal sectional view of a part of a delivery side shaft sealing unit of the screw compressor according to the first modification of the first embodiment. In FIG. 6, a left side is the suction side of the screw compressor, and a right side is the delivery side of the screw compressor. Incidentally, in FIG. 6, the same reference characters as the reference characters shown in FIGS. 1 to 5 indicate the same parts, and therefore detailed description thereof will be omitted.

The screw compressor 1A according to the first modification of the first embodiment which screw compressor is shown in FIG. 6 has a generally similar configuration to that of the first embodiment, but is different in terms of the shape of an annular groove 71A of the delivery side shaft sealing unit and the position of an opening portion 63b on the delivery side shaft hole 53a side of a delivery side bearing oil feeding passage 63A as a shaft sealing fluid supply passage.

Specifically, in a second side wall surface 78A of the annular groove 71A which second side wall surface is on a side closer to the delivery side bearing oil feeding passage 63A, a part on a groove opening side of the second side wall surface 78A is inclined to the delivery side bearing oil feeding passage 63A side with respect to a part on the bottom surface 76 side of the second side wall surface 78A. In other words, the second side wall surface 78A is formed by a perpendicular surface 80 on the bottom surface side which perpendicular surface rises from the bottom surface 76 in the radial direction and an inclined surface 81 on the groove opening side which inclined surface is inclined to the delivery side bearing oil feeding passage 63A side with respect to the perpendicular surface 80. The inclined surface 81 forms a fluid storage portion Fs that can store the lubricating oil (fluid) together with the inner wall surface of the delivery side shaft hole 53a. The outermost diameter of the perpendicular surface 80 or the innermost diameter (do) of the inclined surface 81 is set so as to be larger than the inside diameter (ds) of the seal ring 72. The inclined surface 81 can be formed easily by chamfering a groove opening portion of the second side wall surface 78 of the annular groove 71 of the screw compressor 1 according to the first embodiment.

The delivery side bearing oil feeding passage 63A is set such that the axial position of the opening portion 63b of the delivery side bearing oil feeding passage 63A is the arrangement position of the inclined surface 81 of the annular groove 71A. That is, the delivery side bearing oil feeding passage 63A opens to the fluid storage portion Fs and communicates with the fluid storage portion Fs.

In the screw compressor 1 according to the first embodiment (see FIG. 1 and FIG. 3), the lubricating oil is supplied to the screw compressor 1 by the pressure of the compressed air (working fluid) delivered from the screw compressor 1 to the oil separator 102. In this case, at a start-up of the screw compressor 1, first, the air (working fluid) sucked into the compression chambers C is compressed, and thus the pressure of the air (working fluid) is increased. Then, the compressed air delivered from the screw compressor 1 flows into the oil separator 102, and thus pressure within the oil separator 102 is increased. Hence, at the start-up of the screw compressor 1 or the like, the maximum pressure ($P_{max}$) of the air within the delivery side shaft hole clearance G2 increases in a shorter time than the pressure ($P_{oil}$) of the lubricating oil supplied to the delivery side shaft hole clearance G2. That is, at the start-up or the like, the maximum pressure ($P_{max}$) of the compressed air within the delivery side shaft hole clearance G2 is temporarily higher than the pressure ($P_{oil}$) of the lubricating oil.

At this time, there is a possibility that the pressure of the compressed air within the delivery side shaft hole clearance G2 moves the seal ring 72 to the delivery side bearing oil feeding passage 63 side within the annular groove 71, and presses the second side surface 94 of the seal ring 72 against the second side wall surface 78 of the annular groove 71. In this case, there is a fear that even when the pressure ($P_{oil}$) of the lubricating oil in the delivery side shaft hole clearance G2 subsequently becomes higher than the maximum pressure ($P_{max}$) of the compressed air, the seal ring 72 is not pushed back to the first side wall surface 77 side of the annular groove 71. This is because the size of the delivery side shaft hole clearance G2 is a few ten to a few hundred μm, which is significantly smaller than the width (for example a few mm) of the side surfaces 93 and 94 of the seal ring 72, and thus the pressure receiving area of the side surface in the axial direction of the seal ring 72 which side surface is on the delivery side bearing oil feeding passage 63 side becomes small. The sealing of the delivery side shaft hole clearance G2 can be realized even in this situation. However, the side surface 93 or 94 of the seal ring 72 which side surface is in sliding contact with the annular groove 71 changes according to operating conditions, and therefore it is difficult to predict the life of the seal ring 72 due to wear.

In addition, in a case where the screw compressor 1 is vertically installed such that the suction side is an upper side and the delivery side is a lower side, the seal ring 72 is in contact with the second side wall surface 78 of the annular groove 71 due to the own weight of the seal ring 72 at the start-up of the screw compressor 1. Hence, the above-described problem is presented also in this case.

On the other hand, in the present modification shown in FIG. 6, even when the second side surface 94 of the seal ring 72 is in contact with the second side wall surface 78A of the annular groove 71A at the start-up of the screw compressor 1A or the like, the pressure receiving area of the second side surface 94 of the seal ring 72 which second side surface is on the delivery side bearing oil feeding passage 63A side is sufficiently larger than the cross-sectional area of the delivery side shaft hole clearance G2 by an amount corresponding to the fluid storage portion Fs provided in a region which is on the delivery side bearing oil feeding passage 63A side and on the groove opening side in the annular groove 71A. Hence, when the pressure ($P_{oil}$) of the supplied lubricating oil becomes higher than the maximum pressure ($P_{max}$) of the air in the delivery side shaft hole clearance G2, the seal ring 72 is pushed back to the rotor section 21 side within the annular groove 71A, and the first side surface 93 of the seal ring 72 comes into sliding contact with the first side wall surface 77 of the annular groove 71A. Hence, the first side surface 93 of the seal ring 72 is always worn. It therefore becomes easy to predict the life of the seal ring 72.

In addition, in the present modification, the innermost diameter (do) of the inclined surface 81 of the second side wall surface 78A of the annular groove 71A is set so as to be larger than the inside diameter (ds) of the seal ring 72. Thus, when the seal ring 72 moves to the delivery side bearing oil feeding passage 63A side within the annular groove 71A, the second side surface 94 of the seal ring 72 surely comes into contact with the perpendicular surface 80 of the second side wall surface 78A of the annular groove 71A. Hence, the inclined surface 81 of the annular groove 71A and the delivery side shaft hole 53a do not sandwich or bite the seal ring 72. It is therefore possible to prevent damage to the seal ring 72 due to the biting or the like, damage to the shaft section 23 which damage is caused by the biting of the seal ring 72 or the like, and damage to the delivery side bearings 7 and 8 (see FIG. 1) which damage is caused by the damage to the seal ring 72 due to the biting or the like.

As described above, in addition to effects similar to those of the first embodiment, the first modification of the first embodiment can further provide the following effects. According to the present modification, a part (inclined surface 81) on the groove opening side of the second side wall surface 78A of the annular groove 71A which second side wall surface is on a side closer to the delivery side bearing oil feeding passage 63A is positioned on the side of the delivery side bearing oil feeding passage 63A with respect to a part (perpendicular surface 80) on the bottom surface side of the second side wall surface 78A, and the inclined surface 81 and the delivery side shaft hole 53a form the fluid storage portion Fs. Thus, even when the seal ring 72 moves to the delivery side bearing oil feeding passage 63A side, the pressure receiving area of the second side surface 94 of the seal ring 72 is larger than the cross-sectional area of the delivery side shaft hole clearance G2. Hence, the seal ring 72 can be pushed back to the first side wall surface 77 of the annular groove 71A, and brought into sliding contact with the first side wall surface 77. As a result, the first side surface 93 of the seal ring 72 is worn at all times. It therefore becomes easy to predict the life of the seal ring 72.

In addition, according to the present modification, the delivery side bearing oil feeding passage 63A as the shaft sealing fluid supply passage is configured to open to the fluid storage portion Fs. Thus, the fluid can be supplied to the second side surface 94 of the seal ring 72 without passing through the narrow space of the delivery side shaft hole clearance G2, and a pressure loss of the fluid supplied to the seal ring 72 can be reduced.

Second Modification of First Embodiment

Figure 7:
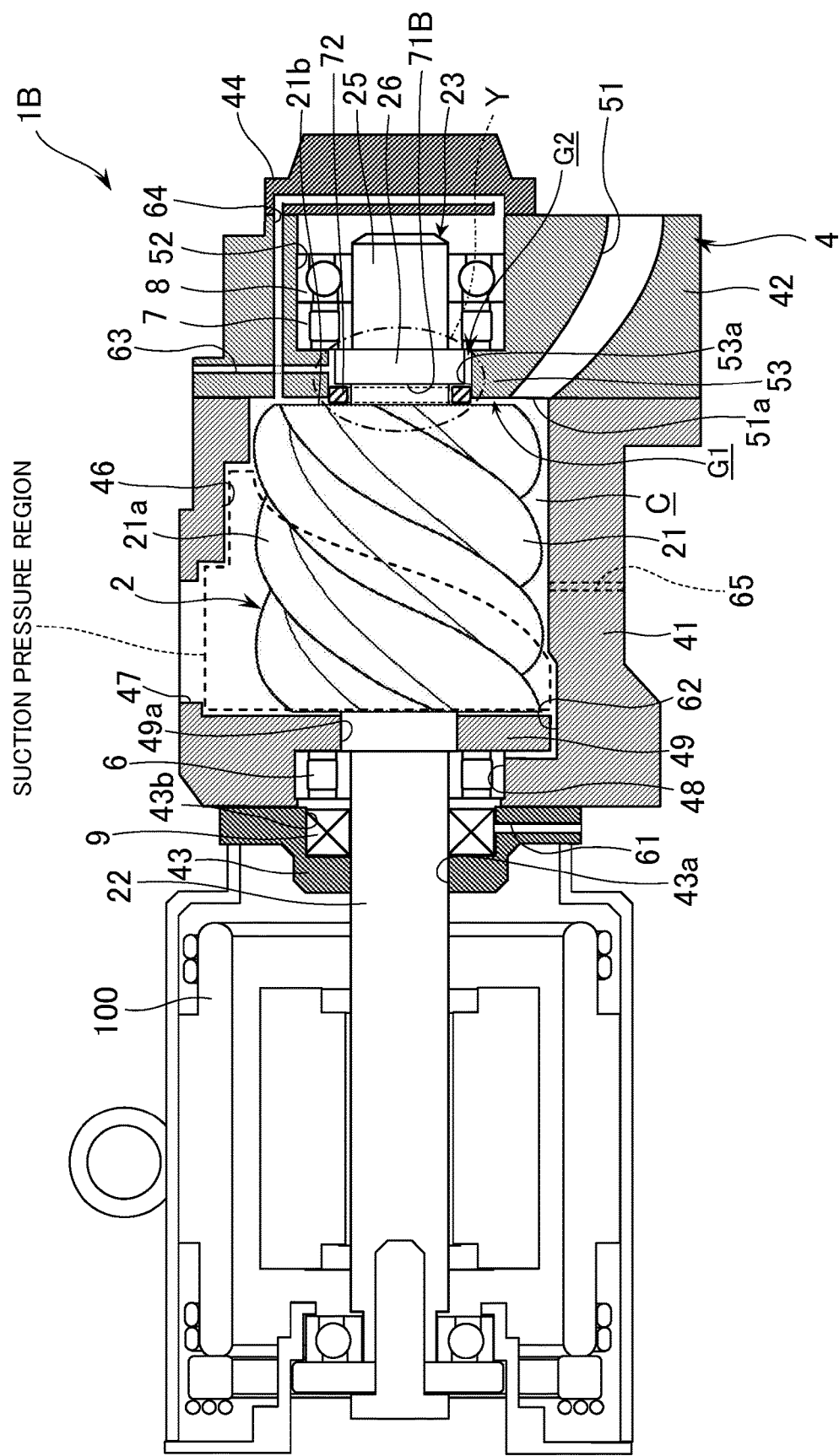
FIG. 7 is a longitudinal sectional view showing a screw compressor according to a second modification of the first embodiment of the present invention.
Figure 8:
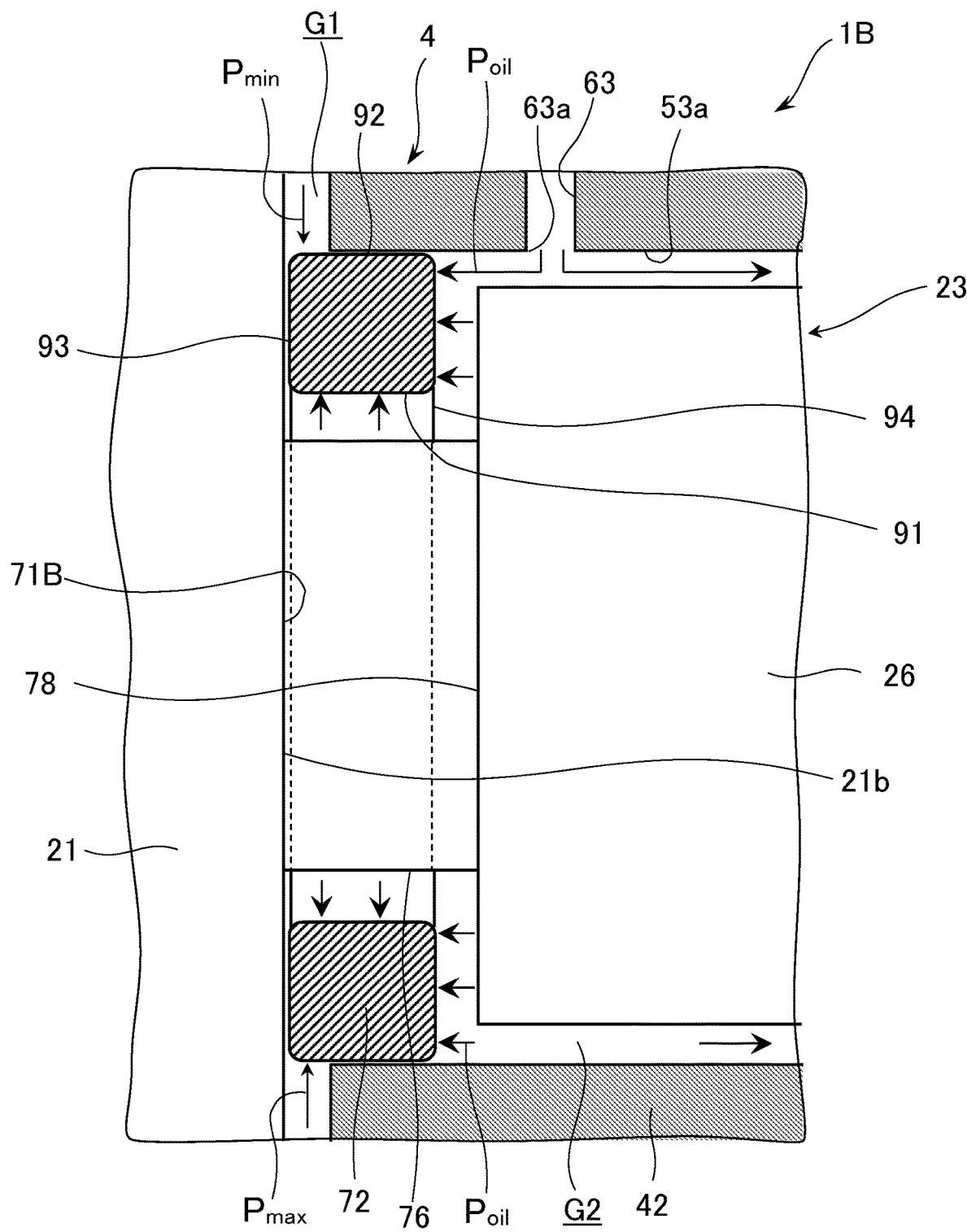
FIG. 8 is an enlarged longitudinal sectional view of a part of the screw compressor according to the second modification of the first embodiment of the present invention, the part being indicated by a symbol Y in FIG. 7.

A screw compressor according to a second modification of the first embodiment to which the present invention is applied will next be illustratively described with reference to FIG. 7 and FIG. 8. FIG. 7 is a longitudinal sectional view of the screw compressor according to the second modification of the first embodiment. FIG. 8 is an enlarged longitudinal sectional view of a part of a delivery side shaft sealing unit of the screw compressor which part is indicated by a character Y in FIG. 7. In FIG. 7 and FIG. 8, a left side is the suction side of the screw compressor, and a right side is the delivery side of the screw compressor. Incidentally, in FIG. 7 and FIG. 8, the same reference characters as the reference characters shown in FIGS. 1 to 6 indicate the same parts, and therefore detailed description thereof will be omitted.

The screw compressor 1B according to the second modification of the first embodiment which screw compressor is shown in FIG. 7 and FIG. 8 has a generally similar configuration to that of the first embodiment, but is different in terms of the position of an annular groove 71B of the delivery side shaft sealing unit. Specifically, the annular groove 71B is provided in an end part on the proximal end side of the large diameter shaft portion 26 of the shaft section 23, and the first side wall surface of the annular groove 71B which first side wall surface is on the rotor section 21 side is formed by the delivery side end surface 21b of the rotor section 21.

In the first embodiment (see FIG. 1 and FIG. 3), the pressure of the compressed air (working fluid) in the delivery side shaft hole clearance G2 acts on the first side surface 93 of the seal ring 72. On the other hand, in the present modification, as shown in FIG. 8, the pressure of the compressed air leaking into the delivery end surface clearance G1 acts on the outer circumferential surface 92 of the seal ring 72. Also in such a case, as in the case of the first embodiment, the pressure ($P_{oil}$) of the lubricating oil (fluid) as a higher pressure than the maximum pressure ($P_{max}$) of the compressed air acts on the inner circumferential surface 91 and the second side surface 94 of the seal ring 72 uniformly in the circumferential direction. Therefore, the outer circumferential surface 92 and the first side surface 93 of the seal ring 72 are pressed against the delivery side shaft hole 53a and the delivery side end surface 21b of the rotor section 21, respectively, so as to resist the pressure of the compressed air leaking into the delivery end surface clearance G1. Consequently, the first side surface 93 of the seal ring 72 and the delivery side end surface 21b of the rotor section 21 are surely in sliding contact with each other, and the outer circumferential surface 92 of the seal ring 72 and the delivery side shaft hole 53a are surely in sliding contact with each other. A leakage of the compressed air from the delivery side shaft hole clearance G2 is therefore interrupted.

In addition, in the first embodiment, a region of the first side surface 93 of the seal ring 72 excluding an outer circumferential side end part of the first side surface 93 is in sliding contact with the first side wall surface 77 of the annular groove 71. On the other hand, in the present modification, the entire surface of the first side surface 93 of the seal ring 72 is in sliding contact with the delivery side end surface 21b of the rotor section 21. Hence, uneven wear of the seal ring 72 is prevented, thus the life of the seal ring 72 can be lengthened.

As described above, in addition to effects similar to those of the first embodiment, the second modification of the first embodiment can further provide the following effects. According to the present embodiment, the delivery side end surface 21b of the rotor section 21 constitutes a side wall surface of the annular groove 71 that is brought into slidable contact with the seal ring 72. Thus, uneven wear of the seal ring 72 is prevented, so that the life of the seal ring 72 can be lengthened.

In addition, according to the present embodiment, because the delivery side end surface 21b of the rotor section 21 constitutes a side wall surface of the annular groove 71 that is brought into slidable contact with the seal ring 72, the region of the delivery end surface clearance G1 is reduced by the contact of the delivery side end surface 21b with the seal ring 72. It is therefore possible to suppress a leakage of the compressed air between compression chambers C via the delivery end surface clearance G1.

Further, according to the present embodiment, the seal ring 72 is brought into sliding contact with the delivery side end surface 21b of the rotor section 21. Thus, the pressure of the compressed air (working fluid) in the delivery end surface clearance G1 acts on the outer circumferential surface 92 of the seal ring 72, whereas the pressure ($P_{oil}$) of the lubricating oil (fluid) as a higher pressure than the maximum pressure ($P_{max}$) of the compressed air in the delivery end surface clearance G1 acts on the inner circumferential surface 91. Therefore, the lubricating oil at a relatively high pressure easily leaks to the delivery end surface clearance G1 side along the delivery side end surface 21b of the rotor section 21, thus wear powder of the seal ring 72 flows into the compression chamber C side via the delivery end surface clearance G1 together with the lubricating oil at the higher pressure. Hence, the wear powder of the seal ring 72 can be prevented from entering into the delivery side bearings 7 and 8, thus there is no fear of shortening the life of the delivery side bearings 7 and 8.

Second Embodiment

Figure 9:
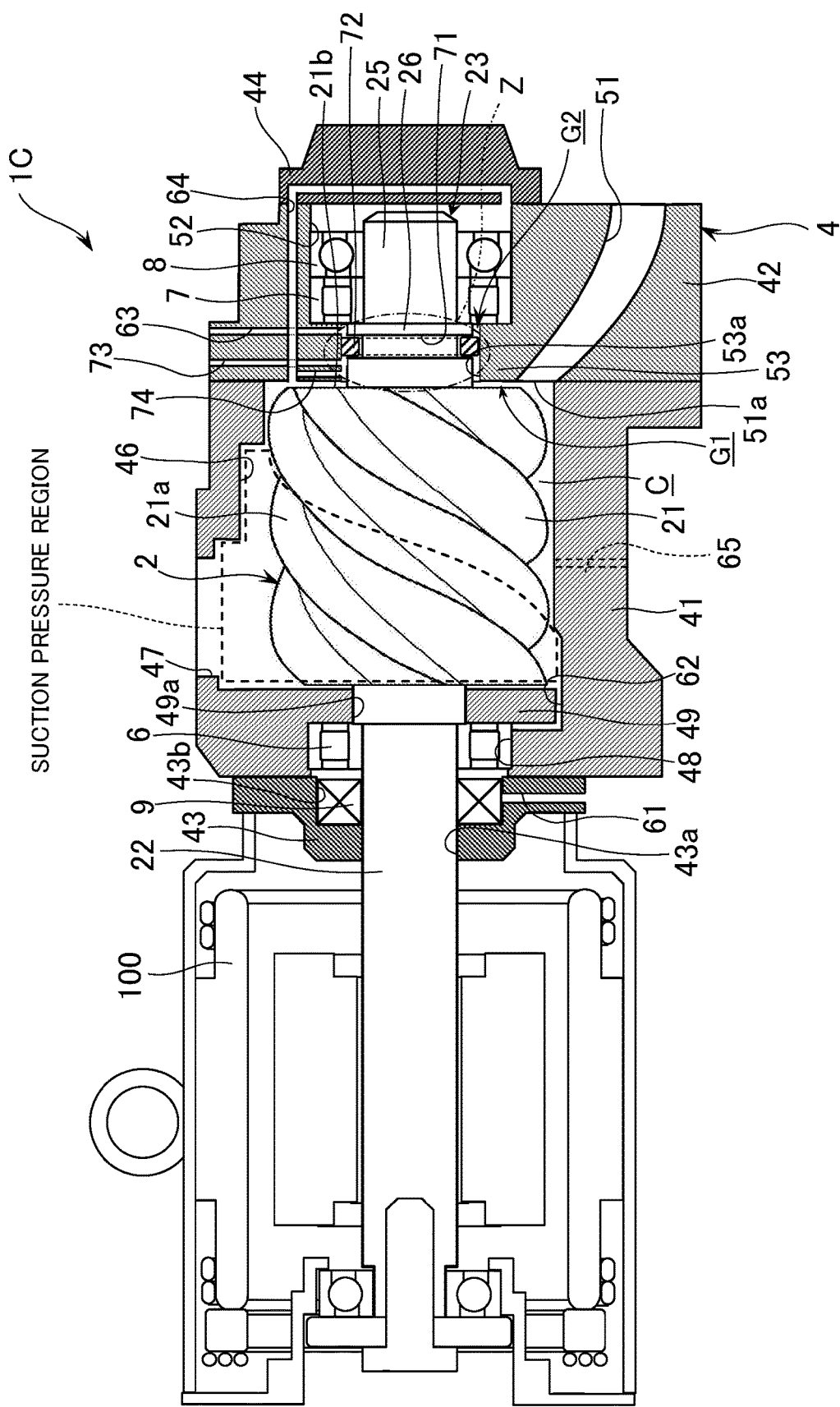
FIG. 9 is a longitudinal sectional view showing a screw compressor according to a second embodiment of the present invention.
Figure 10:
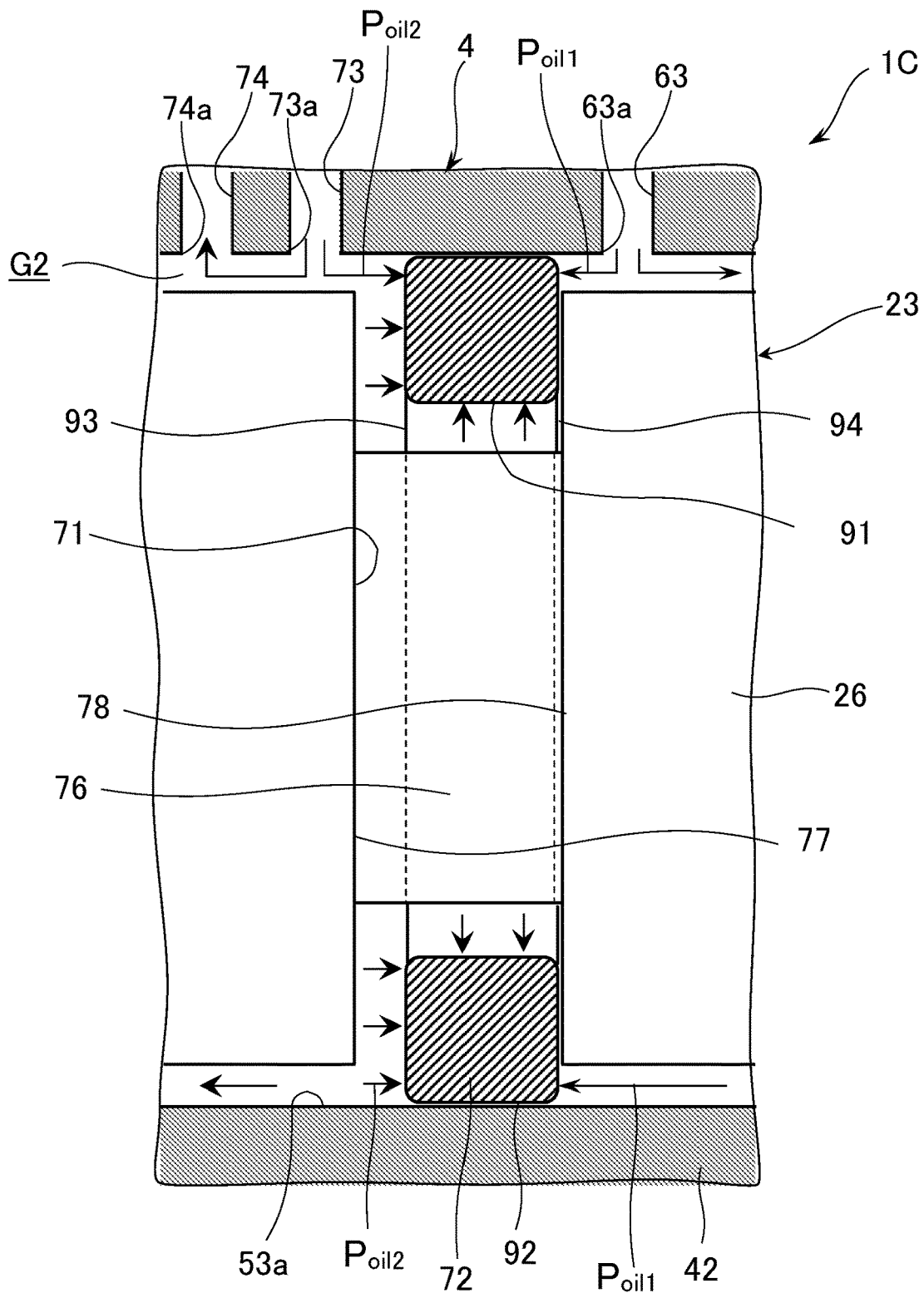
FIG. 10 is an enlarged longitudinal sectional view of a part of the screw compressor according to the second embodiment of the present invention, the part being indicated by a symbol Z in FIG. 9.

A screw compressor according to a second embodiment to which the present invention is applied will next be illustratively described with reference to FIG. 9 and FIG. 10. FIG. 9 is a longitudinal sectional view of the screw compressor according to the second embodiment. FIG. 10 is an enlarged longitudinal sectional view of a part of a delivery side shaft sealing unit of the screw compressor which part is indicated by a character Z in FIG. 9. In FIG. 9 and FIG. 10, a left side is the suction side of the screw compressor, and a right side is the delivery side of the screw compressor. Incidentally, in FIG. 9 and FIG. 10, the same reference characters as the reference characters shown in FIGS. 1 to 8 indicate the same parts, and therefore detailed description thereof will be omitted.

The screw compressor 1C according to the second embodiment shown in FIG. 9 and FIG. 10 is different from the first embodiment in that the screw compressor 1C is newly provided with a shaft sealing fluid supply passage 73 separately from the delivery side bearing oil feeding passage 63 and is newly provided with a shaft sealing fluid recovery passage 74 that recovers the fluid supplied to the seal ring 72.

Specifically, the shaft sealing fluid supply passage 73 is provided in the delivery side casing 42 so as to make the outside of the delivery side casing 42 and the delivery side shaft hole 53a communicate with each other. An opening portion 73a on the delivery side shaft hole 53a side of the shaft sealing fluid supply passage 73 is provided so as to be located on the proximal end side (left side in FIG. 9 and FIG. 10) of the shaft section 23 on the delivery side with respect to the seal ring 72. The shaft sealing fluid supply passage 73 is configured to supply the fluid to the proximal end side of the shaft section 23 in the axial direction (first side surface 93 side) in the seal ring 72. The pressure ($P_{oil2}$) of the fluid supplied to the first side surface 93 side of the seal ring 72 via the shaft sealing fluid supply passage 73 is set so as to be higher than a pressure acting on the distal end side of the shaft section 23 in the axial direction (second side surface 94 side) in the seal ring 72, that is, the pressure ($P_{oil1}$) of the lubricating oil for the delivery side bearings 7 and 8 which lubricating oil is supplied to the delivery side shaft hole clearance G2 via the delivery side bearing oil feeding passage 63.

The shaft sealing fluid supply passage 73 is, for example, supplied with the lubricating oil as a fluid from the oil separator 102 as a shaft sealing fluid supply source. In this case, a pressure difference between the lubricating oil supplied via the shaft sealing fluid supply passage 73 and the lubricating oil supplied via the delivery side bearing oil feeding passage 63 is secured by, for example, providing the delivery side bearing oil feeding passage 63 or a lubricating oil system connected to the delivery side bearing oil feeding passage 63 with a restrictor or a pressure reducing valve.

The shaft sealing fluid recovery passage 74 is provided in the delivery side casing 42 so as to communicate with the delivery side shaft hole 53a. An opening portion 74a on the delivery side shaft hole 53a side of the shaft sealing fluid recovery passage 74 is provided so as to be located on the proximal end side of the shaft section 23 (left side in FIG. 9 and FIG. 10) with respect to the opening portion 73a of the shaft sealing fluid supply passage 73.

In the present embodiment, the lubricating oil at the pressure ($P_{oil2}$) higher than the pressure ($P_{oil2}$) of the lubricating oil supplied via the delivery side bearing oil feeding passage 63 is supplied to the delivery side shaft hole clearance G2 via the shaft sealing fluid supply passage 73. Thus, the inner circumferential surface 91 of the seal ring 72 and an entire area, in the circumferential direction, of the first side surface 93 (left side surface in FIG. 9 and FIG. 10) on a side closer to the shaft sealing fluid supply passage 73 receive the pressure ($P_{oil2}$) of the lubricating oil at the relatively high pressure. Hence, the seal ring 72 receives a force in the distal end direction of the shaft section 23 (right direction in FIG. 9 and FIG. 10) against the pressure ($P_{oil1}$) of the lubricating oil for the delivery side bearings 7 and 8, thus the second side surface 94 (right side surface in FIG. 9 and FIG. 10) of the seal ring 72 is pressed against the second side wall surface 78 of the annular groove 71, and the outer circumferential surface 92 of the seal ring 72 is pressed against the inner wall surface of the delivery side shaft hole 53a.

Because the pressure ($P_{oil2}$) higher than the pressure ($P_{oil1}$) of the lubricating oil for the delivery side bearings 7 and 8 thus acts on the entire area, in the circumferential direction, of the first side surface 93 on the shaft sealing fluid supply passage 73 side of the seal ring 72 at all times, the seal ring 72 can be prevented from inclining within the annular groove 71 even when the compressed air flowing into the delivery side shaft hole clearance G2 has a pressure distribution in the circumferential direction. Therefore, the second side surface 94 of the seal ring 72 and the second side wall surface 78 of the annular groove 71 are surely in sliding contact with each other, and the outer circumferential surface 92 of the seal ring 72 and the delivery side shaft hole 53a are surely in sliding contact with each other. In addition, as in the case of the first embodiment, the gap of the abutment 72a of the seal ring 72 disappears due to thermal expansion. Hence, a leakage of the working fluid (compressed air) in the delivery side shaft hole clearance G2 is interrupted. The compressed air leaking from the compression chambers C into the delivery side bearing chamber 52 is therefore decreased significantly, which makes it possible to save energy of the screw compressor 1C.

The lubricating oil supplied to the delivery side shaft hole clearance G2 via the shaft sealing fluid supply passage 73 applies a pressure to the first side surface 93 on the shaft sealing fluid supply passage 73 side of the seal ring 72, and is then sucked into the shaft sealing fluid recovery passage 74. Thereafter, the lubricating oil in the shaft sealing fluid recovery passage 74 flows into the compression chambers C in the suction process via the delivery side oil recovery passage 64, and is delivered from the delivery flow passage 51 to the outside together with the compressed air.

As described above, according to the second embodiment, the lubricating oil (fluid) at the pressure ($P_{oil2}$) higher than the pressure ($P_{oil1}$) of the lubricating oil for the delivery side bearings 7 and 8, which pressure ($P_{oil1}$) acts on the second side surface 94 (one side in the axial direction) of the seal ring 72, is supplied to the first side surface 93 side (other side in the axial direction) of the seal ring 72 via the shaft sealing fluid supply passage 73. Thus, even when the compressed air (working fluid) leaking into the delivery side shaft hole clearance G2 has a pressure distribution in the circumferential direction, the seal ring 72 is uniformly pressed against the inner wall surface of the delivery side shaft hole 53a and the second side wall surface 78 of the annular groove 71, and is not inclined. Hence, the delivery side shaft hole clearance G2 can be sealed surely, thus high shaft sealing performance can be exerted.

In addition, according to the present embodiment, the opening portion 73a of the shaft sealing fluid supply passage 73 is disposed on the proximal end side of the shaft section 23 on the delivery side with respect to the seal ring 72. The first side surface 93 side (rotor section 21 side) of the seal ring 72 thus receives the pressure of the lubricating oil (fluid) at the relatively high pressure which lubricating oil (fluid) is supplied via the shaft sealing fluid supply passage 73 and the pressure of the air (working fluid) leaking into the delivery side shaft hole clearance G2. Therefore, also at a start-up and a rated operation of the screw compressor 1, the second side surface 94 of the seal ring 72 is always in sliding contact with the annular groove 71. That is, the side surface 94 of the seal ring 72 which side surface is in sliding contact with the annular groove 71 does not change according to operating conditions of the screw compressor 1C. It is therefore easy to predict the life of the seal ring 72 due to wear.

Further, according to the present embodiment, the lubricating oil (fluid) at the relatively high pressure which lubricating oil (fluid) is supplied to the delivery side shaft hole clearance G2 via the shaft sealing fluid supply passage 73 is recovered by the shaft sealing fluid recovery passage 74. It is thus possible to suppress a leakage of the lubricating oil (fluid) from the delivery side shaft hole clearance G2 to the delivery end surface clearance G1. It is therefore possible to reduce stirring power caused by the lubricating oil (fluid) leaking into the delivery end surface clearance G1.

In addition, according to the present embodiment, the delivery side shaft hole clearance G2 can be sealed by supplying the delivery side shaft hole clearance G2 with the lubricating oil at the pressure ($P_{oil2}$) higher than the pressure ($P_{oil1}$) of the lubricating oil supplied via the delivery side bearing oil feeding passage 63. Thus, shaft sealing is possible even when the lubricating oil (fluid) at a pressure lower than the maximum pressure of the compressed air (working fluid) leaking into the delivery side shaft hole clearance G2 is supplied. Hence, it is also possible to make the supply pressure of the fluid to the shaft sealing fluid supply passage 73 lower than in the cases of the first embodiment and the modifications thereof.

Other Embodiments

It is to be noted that the present invention is not limited to the foregoing embodiments, but includes various modifications. The foregoing embodiments are described in detail to describe the present invention in an easily understandable manner, and are not necessarily limited to embodiments including all of the described configurations. That is, a part of a configuration of a certain embodiment can be replaced with a configuration of another embodiment, and a configuration of another embodiment can be added to a configuration of a certain embodiment. In addition, for a part of a configuration of each embodiment, another configuration can be added, deleted, or substituted.

For example, in the foregoing embodiments, the screw compressors 1, 1A, 1B, and 1C that compress air have been described as examples. However, the present invention can be applied to a screw compressor that compresses a refrigerant such as ammonia, $CO_2$, or the like. In addition, while the oil-supplied type screw compressors 1, 1A, 1B, and 1C have been described as examples, the present invention can be applied also to a water lubrication type screw compressor that is supplied with water. In addition, while the twin rotor type screw compressors 1, 1A, 1B, and 1C have been described as examples, the present invention can be applied also to screw compressors of other than the twin rotor type such as a single rotor type, a triple rotor type, and the like. Incidentally, in a single rotor type screw compressor, the rotor section of a screw rotor has a plurality of helix grooves meshing with lobes of a gate rotor, and is in a screw shape.

In addition, in the foregoing embodiments, an example has been illustrated in which the sectional shape of the seal ring 72 is rectangular. However, the sectional shape of the seal ring 72 is optional as long as the sectional shape of the seal ring 72 is a shape that seals the delivery side shaft hole clearance G2 when the outer circumferential portion and one side, in the axial direction, of the seal ring are in sliding contact with the delivery side shaft hole 53*a* and the side wall surface of the annular groove 71 or 71A. For example, the side surface and the outer circumferential surface of the seal ring 72 can be formed by a surface having a certain curvature, or formed by an uneven shape provided with a recess, a groove, or the like.

Incidentally, in the foregoing embodiments, an example has been illustrated in which the lubricating oil supplied to the delivery side bearings 7 and 8 is used as a fluid supplied to the seal ring 72 via the shaft sealing fluid supply passage. However, a liquid such as water or the like or a gas such as instrumentation air or the like can also be used according to the type of the screw compressor or conditions. In this case, however, a shaft sealing fluid supply passage needs to be provided separately from the lubricating oil supply passage that supplies the lubricating oil to the delivery side bearings 7 and 8.

In addition, in the foregoing embodiments, an example has been illustrated in which the oil separator 102 is used as the shaft sealing fluid supply source. However, an optional supply source other than the oil separator 102 can be used as the shaft sealing fluid supply source.

In addition, in the first modification of the foregoing first embodiment, an example has been illustrated in which the second side wall surface 78A of the annular groove 71A which second side wall surface is on a side closer to the delivery side bearing oil feeding passage 63A is formed by the perpendicular surface 80 on the bottom surface side and the inclined surface 81 on the groove opening side. However, it suffices for the part on the groove opening side of the second side wall surface 78A to be a storage portion forming surface that is located on the delivery side bearing oil feeding passage (shaft sealing fluid supply passage) 63A side with respect to the perpendicular surface 80, and forms the fluid storage portion Fs together with the inner wall surface of the delivery side shaft hole 53*a*. For example, a part on the groove opening side of the second side wall surface which part is indicated by a chain double-dashed line in FIG. 6 is not an inclined surface, but is a stepped storage portion forming surface 81D.

DESCRIPTION OF REFERENCE CHARACTERS

1, 1A, 1B, 1C: Screw compressor
2: Male rotor (screw rotor)
3: Female rotor (screw rotor)
4: Casing
7, 8: Delivery side bearing
21, 31: Rotor section
21*a*, 31*a*: Lobe
21*b*, 31*b*: Delivery side end surface
22: Shaft section on a suction side
23, 33: Shaft section on a delivery side
49*a*: Suction side shaft hole (shaft hole)
53*a*: Delivery side shaft hole (shaft hole on the delivery side)
71, 71A, 71B: Annular groove
77: First side wall surface
78, 78A: Second side wall surface
72: Seal ring
63, 63A: Delivery side bearing oil feeding passage (shaft sealing fluid supply passage)
63*a*, 63*b*: Opening portion
73: Shaft sealing fluid supply passage
73*a*: Opening portion
74: Shaft sealing fluid recovery passage
74*a*: Opening portion
80: Perpendicular surface
81: Inclined surface
81D: Storage portion forming surface
G2: Delivery side shaft hole clearance (clearance between the shaft section on the delivery side and the shaft hole on the delivery side)
Fs: Fluid storage portion

The invention claimed is:

1. A screw compressor comprising:
   a screw rotor having a screw-shaped rotor section and shaft sections each arranged at respective end portions on both sides, in an axial direction, of the rotor section;
   a casing having shaft holes through which the shaft sections are inserted, the casing housing the screw rotor; and
   a delivery side shaft sealing unit configured to seal a clearance between a shaft section on a delivery side and a shaft hole on the delivery side against leakage of a working fluid,
   the delivery side shaft sealing unit including
      an annular groove provided in an outer circumferential portion in the shaft section on the delivery side, the outer circumferential portion being opposed to the shaft hole on the delivery side,
      a seal ring disposed movably in an axial direction of the shaft section on the delivery side within the annular groove, the seal ring being configured to make sliding contact with an inner wall surface of the shaft hole on the delivery side and a first side wall surface of the annular groove, and
   a shaft sealing fluid supply passage provided in the casing so as to make an outside of the casing and the shaft hole on the delivery side communicate with each other, the shaft sealing fluid supply passage being configured to supply a fluid to a second side surface, in an axial direction with respect to a second side wall surface of the annular groove, of the seal ring, and
   pressure of the fluid that is supplied to the one side, in the axial direction, of the seal ring via the shaft sealing fluid supply passage being set higher than pressure that acts on a first side surface, in an axial direction with respect to a first side wall surface of the annular groove, of the seal ring.

2. The screw compressor according to claim 1, wherein an opening portion on a shaft hole side of the shaft sealing fluid supply passage is located on a right end side of the shaft section on the delivery side in the axial direction with respect to the second side surface of the seal ring, and the pressure of the fluid that is supplied via the shaft sealing fluid supply passage is set higher than pressure of the working fluid that flows into the clearance.

3. The screw compressor according to claim 2, wherein a delivery side end surface of the rotor section constitutes one of side wall surfaces of the annular groove.

4. The screw compressor according to claim 2, wherein the shaft sealing fluid supply passage is supplied with a lubricating oil to be supplied to a delivery side bearing that rotatably supports the screw rotor.

5. The screw compressor according to claim 1, wherein an opening portion on a shaft hole side of the shaft sealing fluid supply passage is located on a left end side of the shaft section on the delivery side in the axial direction with respect to the first side surface of the seal ring.

6. The screw compressor according to claim 5, wherein the delivery side shaft sealing unit further includes a shaft sealing fluid recovery passage provided in the casing so as to communicate with the shaft hole on the delivery side, and an opening portion on the shaft hole side of the shaft sealing fluid recovery passage is located on the left end side of the shaft section on the delivery side in the axial direction with respect to the opening portion on the shaft hole side of the shaft sealing fluid supply passage.

7. The screw compressor according to claim 1, wherein a part on a groove opening side in a second side wall surface on a side closer to the shaft sealing fluid supply passage among side wall surfaces defining the annular groove is located on a side of the shaft sealing fluid supply passage with respect to a part on a bottom surface side in the second side wall surface on the side closer to the shaft sealing fluid supply passage, and the part on the groove opening side forms a fluid storage portion configured to store the fluid, together with the inner wall surface of the shaft hole on the delivery side.

8. The screw compressor according to claim 7, wherein an innermost diameter of the part on the groove opening side in the second side wall surface on the side closer to the shaft sealing fluid supply passage among the side wall surfaces defining the annular groove is set larger than an inside diameter of the seal ring.

9. The screw compressor according to claim 7, wherein the shaft sealing fluid supply passage opens to the fluid storage portion.

10. The screw compressor according to claim 7, wherein the part on the groove opening side in the second side wall surface on the side closer to the shaft sealing fluid supply passage among the side wall surfaces defining the annular groove is an inclined surface inclined to the side of the shaft sealing fluid supply passage with respect to the part on the bottom surface side.

* * * * *